US006719242B2

(12) United States Patent
Floyd, Jr. et al.

(10) Patent No.: US 6,719,242 B2
(45) Date of Patent: Apr. 13, 2004

(54) COMPOSITE CORE

(75) Inventors: Arnold B. Floyd, Jr., Hartsville, SC (US); David E. Rhodes, Hartsville, SC (US); Gerald L. Lane, Jr., Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/727,430

(22) Filed: Dec. 1, 2000

(65) Prior Publication Data

US 2002/0066824 A1 Jun. 6, 2002

(51) Int. Cl.7 .............................................. B65H 75/14
(52) U.S. Cl. .................. 242/609.4; 242/610.4; 242/610.6
(58) Field of Search ................ 242/609.4, 609, 242/118.32, 118.31, 610.4, 610.6

(56) References Cited

U.S. PATENT DOCUMENTS

| | | | |
|---|---|---|---|
| 1,074,590 A | 9/1913 | Kempshall | |
| 1,608,206 A | 11/1926 | Freedlander | |
| 2,288,966 A | 7/1942 | Blanchet | 93/94 |
| RE23,046 E | 10/1948 | Blanchet | 93/94 |
| 2,651,241 A | 9/1953 | Hornbostel | 92/73 |
| 2,659,547 A * | 11/1953 | Broadbent et al. | 242/609.4 |
| 2,721,043 A | 10/1955 | Meretey | 242/122 |
| 2,953,317 A | 9/1960 | Atwood et al. | 242/118.31 |
| 3,000,590 A | 9/1961 | Dunlap et al. | 242/118.31 |
| 3,010,194 A | 11/1961 | Fratzke | 29/235 |
| 3,095,161 A | 6/1963 | Atwood et al. | 242/159 |
| 3,107,067 A | 10/1963 | Atwood et al. | 242/118.32 |
| 3,350,030 A | 10/1967 | Green | 242/118.32 |
| 3,402,902 A | 9/1968 | Schmidt | 242/118.31 |
| 3,451,639 A | 6/1969 | Atwood et al. | 242/118.32 |
| 3,571,878 A | 3/1971 | Alderfer | 29/132 |
| 3,628,747 A | 12/1971 | Bakewell | 242/118.32 |
| 3,910,513 A | 10/1975 | Gelin et al. | 242/18 G |
| 3,917,185 A | 11/1975 | Canada et al. | 242/68.5 |
| 4,052,020 A | 10/1977 | Knox | 242/71.8 |
| 4,135,553 A | 1/1979 | Evans et al. | 138/141 |
| 4,188,979 A | 2/1980 | Nakamura et al. | 138/109 |
| 4,832,276 A | 5/1989 | Gebhardt et al. | 242/78.1 |
| 4,934,622 A | 6/1990 | Hakiel | 242/68.5 |
| 5,091,027 A | 2/1992 | Watanabe | 156/172 |
| 5,110,382 A | 5/1992 | Terry et al. | 156/77 |
| 5,138,766 A | 8/1992 | Kimura et al. | 29/895.212 |
| 5,206,992 A | 5/1993 | Carlson et al. | 29/895.32 |
| 5,324,248 A | 6/1994 | Quigley | 492/50 |
| 5,497,549 A | 3/1996 | Rademacher | 29/895.21 |
| 5,514,429 A | 5/1996 | Kamihgaraguchi et al. | 428/34.2 |
| 5,669,045 A | 9/1997 | Swain | 399/159 |
| 5,711,072 A | 1/1998 | Nakamura | 29/895.32 |
| 5,857,643 A * | 1/1999 | Czuprynski et al. | 242/613 |

FOREIGN PATENT DOCUMENTS

| | | |
|---|---|---|
| EP | 0 747 314 | 12/1996 |
| JP | 5-201597 A | 8/1993 |

* cited by examiner

Primary Examiner—John Q. Nguyen
(74) Attorney, Agent, or Firm—Drinker Biddle & Reath LLP

(57) ABSTRACT

A composite core tube is provided for the winding of a web of material. A hollow cylindrical core is covered by a water-resistant rigid sleeve in a heat fit manner to provide a winding surface. The sleeve is selected and finished to control the winding characteristics of the core.

17 Claims, 4 Drawing Sheets

COMPOSITE CORE

FIELD OF THE INVENTION

The present invention relates to a composite core for the winding of web material. In particular the invention is directed to a sleeve for covering a cylindrical tube.

BACKGROUND OF THE INVENTION

Web material, such as paper products and the like, is typically mechanically wound onto a rotating core member. Covers are commonly applied to winding web cores to improve the performance of the winding process. The use of a cover diminishes the occurrence of damage to the web during winding, thereby reducing the necessity to discard deformed webs. The covers deform on the outer surface to accommodate irregularities in the web.

Developments in the use of cores with covers resulted in several methods of application of plastic covers to core members. The application of heat or pressurized air to either the core or tube members changes their diameter, facilitating the overlapping connection of the two.

For example, U.S. Pat. No. 2,659,547 (Broadbent et al.) shows a cylindrical barrel covered by a sleeve, wherein the sleeve is heated to expand its dimensions sufficiently so that it can be slid over the barrel. As the sleeve cools, it contracts to form a tight fit between itself and the barrel. U.S. Pat. No. 3,289,973 (Spencer) shows a paper tube having a plastic sleeve slid over the outer surface of the tube, wherein the tube is heated to reduce its moisture content which, in turn, reduces the diameter of its outer surface. Once the diameter is reduced, the sleeve is slid over the tube. Thereafter, the tube absorbs moisture which expands its outer surface into frictional engagement with the inner surface of the sleeve.

Japanese Patent Publication No. 405201597 shows a fiberglass reinforced plastic cylinder having a coating of polyethylene on its outer surface. The coating may be obtained by covering the surface of the cylinder with a heat-shrinkable tube of ultra-high polymer polyethylene or by forming it directly on the surface of the cylinder.

U.S. Pat. No. 5,857,643 (Czuprynski et al.) shows a core for winding a web of material, wherein the core comprises a rigid cylindrical member over which is applied a deformable cover. To assemble the core, pressurized air is used to expand the cover so that it can be slid over the cylindrical member. U.S. Pat. No. 3,035,331 (Wieman) shows a resilient cylindrical body on which is mounted a non-stretchable sleeve. A vacuum is used to draw air out from the body to reduce its diameter so that the sleeve can be slipped over it. When the vacuum is disconnected the pressure within the body equalizes with the surrounding atmosphere and expands the body into tight frictional engagement with the sleeve.

The above cited patents have several drawbacks. First, the outer surface of the covers are generally not smooth. The outer surface of the covers have to be grinded down or smoothed before they can be used to wind certain web materials. Secondly, the prior art utilizes a rigid core and a flexible shrinkable sleeve. The composite core of the invention uses two rigid and sized members. The advantage of this is that a wide variety of materials can be used to manufacture the core and sleeve. The sleeve of the invention is heated to expand the sleeve, which teaches away from the '597 Japanese publication. Thirdly, the covers are generally slight in thickness, to facilitate expansion and sliding over the underlying core. The "thin" covers reduce the stability of the core during winding, leading to irregularities in the web. Finally, to overcome the instability, end caps are commonly used to provide rigidity and strength to the core. However the end caps add to the time and labor costs of preparing cores for reuse.

The common use of cores in the winding of webs has created the need for strong, reusable and washable cores. The cores typically need to be cleaned between uses by immersing them in a solution. Additionally, many applications of the core winding member require that manufacturers of webs be able to match various web materials with different core winding properties.

SUMMARY OF THE INVENTION

The present invention is a reusable composite core or winding web material comprising a hollow cylindrical base tube which is covered by a sleeve. At room temperature, the sleeve has an inner diameter that is smaller than the diameter of outer surface of the tube, but larger than the inner diameter of the tube. The tube is made of fiber, paper, thermoplastic, fiberglass, polyester, a polyester-paper composite, or the like. The sleeve is made of an extruded thermoplastic material that is washable and stain resistant. The sleeve protects the tube's outer surface from staining. The materials used for both the tube and the sleeve may be manipulated or finished to control the performance characteristics of the core.

To assemble the composite core, the sleeve is heated to expand the diameter of its inner surface so that it can be slid over the tube. Thereafter, the sleeve is allowed to cool to room temperature, which causes the diameter of its inner surface to contract into engagement with the outer surface of the tube, yielding a tight fit. Alternatively, the diameter of the outer surface of the tube may be reduced by cooling, drying or other techniques.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
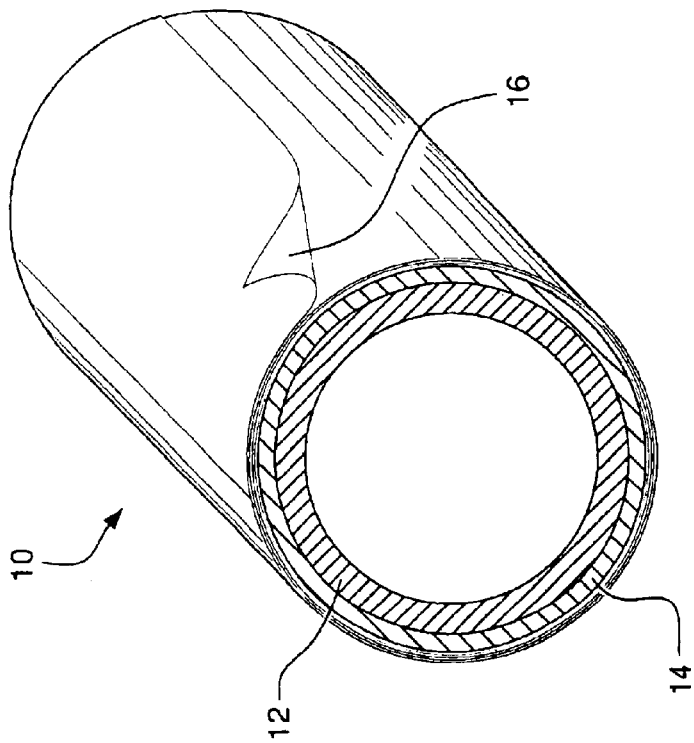
FIG. 1 illustrates a perspective view of the present invention.

In the drawings, where like numerals indicate like elements, there is shown a composite core in accordance with the present invention. As shown in FIG. 1, a composite core 10 according to the present invention includes a cylindrical tube 12 and a rigid sleeve 14 for the winding of web material 16. The tube 12 and sleeve 14 are in communication with one another in an overlapping concentric relationship. The overlapping relationship is formed by an interference fit, heat fit or adhesive connection between the tube 12 and the sleeve 14, as will be described in more detail below.

Figure 2:
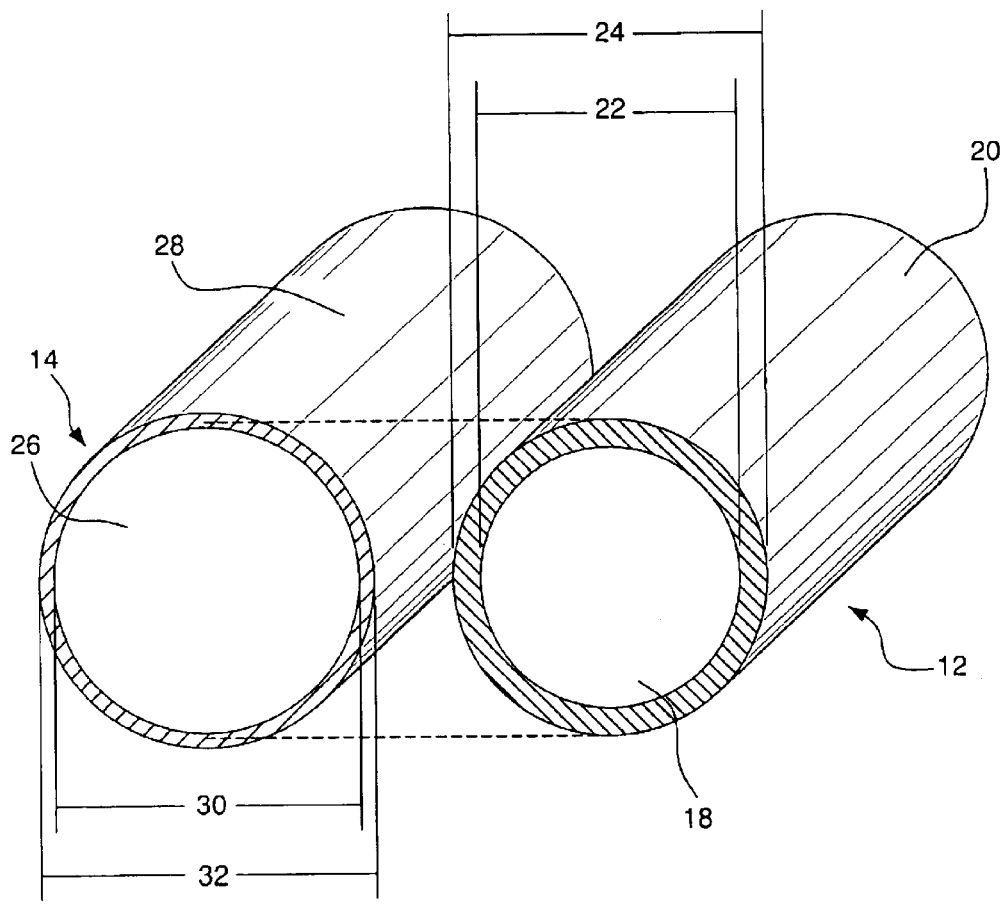
FIG. 2 illustrates a perspective view of the tube and sleeve members of the present invention.

As shown in FIG. 2, the cylindrical tube 12 is hollow and forms the base of the composite core for the winding of web material. The tube 12 has an inner surface 18 and an outer surface 20 which define an inner diameter 22 and an outer diameter 24, respectively. The tube 12 may be attached to a rotating means, providing the impetus for winding web material around the composite core.

The rigidity of the tube 12 is provided by the hardness of the material and the thickness of the sheet forming the tube 12. Preferably, the tube is formed of any one of fiberglass resin composite with a Shore D Hardness of 90, paper resin composite with a Shore D Hardness of 88, and paper with a Shore D Hardness of 62. Fiberglass pipe is used to form a high strength tube. The thickness of tube 12, the difference between the outer diameter 24 and inner diameter 22, is sufficient to ensure the tube 12 maintains its shape when the sleeve 14 is disposed over the tube 12 in an interference fit.

The sleeve 14 is hollow, forming a cover for the tube 12, and provides the surface for the winding web material 16. The sleeve 14 has an inner surface 26 and an outer surface 28 which define an inner diameter 30 and an outer diameter 32, respectively. The outer surface 28 is adapted to have web material wound thereon. The sleeve 14 has an inner diameter 30 that is smaller than the outer diameter 20 of the tube 12. The sleeve 14 is slid over the tube 12, wherein the sleeve inner surface 26 contacts the tube outer surface 20.

The sleeve 14 is made of a rigid material, wherein the rigidity is achieved by the properties of the material and the thickness of the sheet forming the sleeve 14. Preferably the rigid sleeve 14 is formed from extruded pipe material such as polypropylene, polystyrene, nylon ABS or a combination thereof. The sleeve 14 is of sufficient thickness to prevent irregularities in and collapse of the sleeve 14 during the winding process.

The sleeve 14 serves as a moisture barrier for fiber tubes, which also improves dimensional stability of the composite core. The sleeve 14 has a hard polished outer surface that may be grinded down and repolished, permitting reuse.

The sleeve 14 imparts a variety of performance characteristics to the underlying tube 12, such as start-up characteristics, static free properties, conductivity properties, image free surfaces, shapes, a variety of surface hardnesses, non-photosensitive surface, or the like (as will be described in more detail below).

In one suitable configuration, a 6 inch fiberglass resin composite tube 12 has an inner diameter 22 of 6.020 inches (+/−0.008) and an outer diameter 24 of 6.475 inches (+/−0.015). An extruded polypropylene and polystyrene sleeve 14 has an inner diameter 30 of 6.400 inches (+/−0.015) and a thickness of 0.100 inches (+0.050/−0.025).

In another suitable configuration, a 10 inch fiberglass resin composite tube 12 has a 10.040 inch (+/−0.008) inner diameter and a 10.510 inch (+/−0.015) outer diameter. The extruded polypropylene and polystyrene sleeve 14 has an inner diameter of 10.460 inches (+/−0.015) and a thickness of 0.125 inches (+0.50/−0.025).

The operation of disposing the sleeve 14 over the tube 12 is described as being for a 6 inch fiberglass tube 12. However, it should be kept in mind that the invention is not limited to a particular material, size or shape of tube 12 and sleeve 14.

As shown in FIG. 2, at room temperature the outer diameter 24 of tube 12 is larger than the inner diameter 30 of sleeve 14, but smaller than the outer diameter 32 of the sleeve 14. Placement of the sleeve 14 over the tube 12 is achieved by a heat fit.

Figure 3:
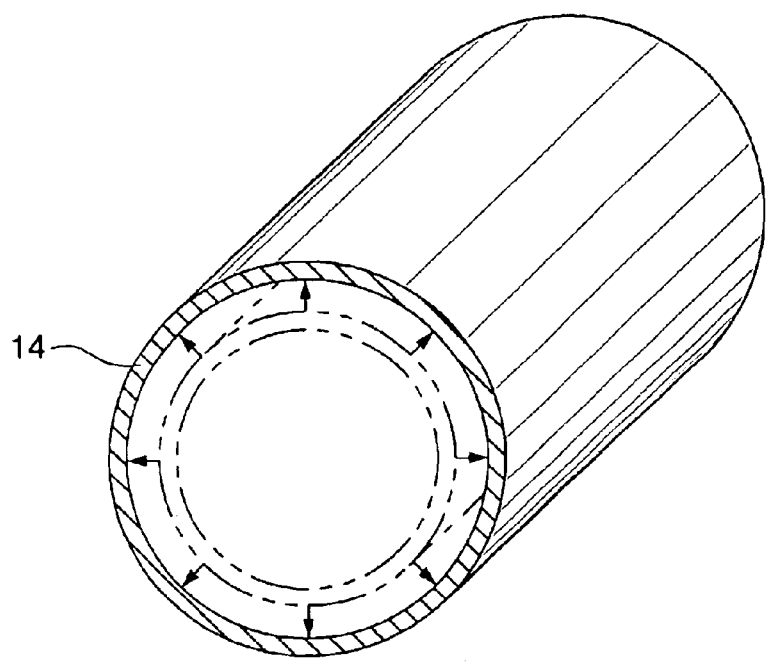
FIG. 3 is a perspective view of the expansion of the sleeve of the invention with the original sleeve diameter shown in phantom.
Figure 4:
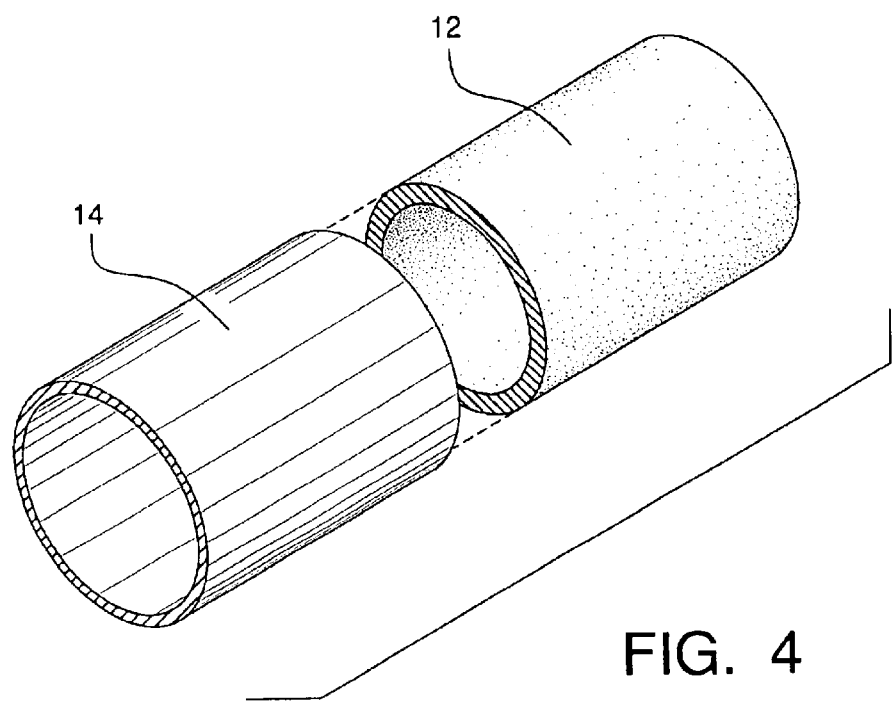
FIG. 4 illustrates a perspective view of an expanded sleeve prior to sliding over a tube of the present invention.

Heat is applied to the sleeve 14 through the use of a heat source, such as an oven or the like. When heat is applied, thermal expansion of the inner diameter 30 of the sleeve 14 occurs, increasing the inner diameter to a length greater than the outer diameter 24 the tube 12. See FIG. 3. For example, at room temperature the outer diameter 24 of the 6 inch fiberglass resin composite tube, as described above, is 6.475 inches while the inner diameter 30 of the polypropylene and polystyrene sleeve 14 is 6.400 inches. When the sleeve 14 is heated to between 275 and 300 degrees Fahrenheit, the inner diameter 30 of the sleeve 14 expands to approximately 6.500 inches. Once the sleeve inner diameter 30 has expanded to greater than the outer diameter 24 of the tube 12, the sleeve 14 is slid over the tube 12, as seen in FIG. 4.

Figure 5:
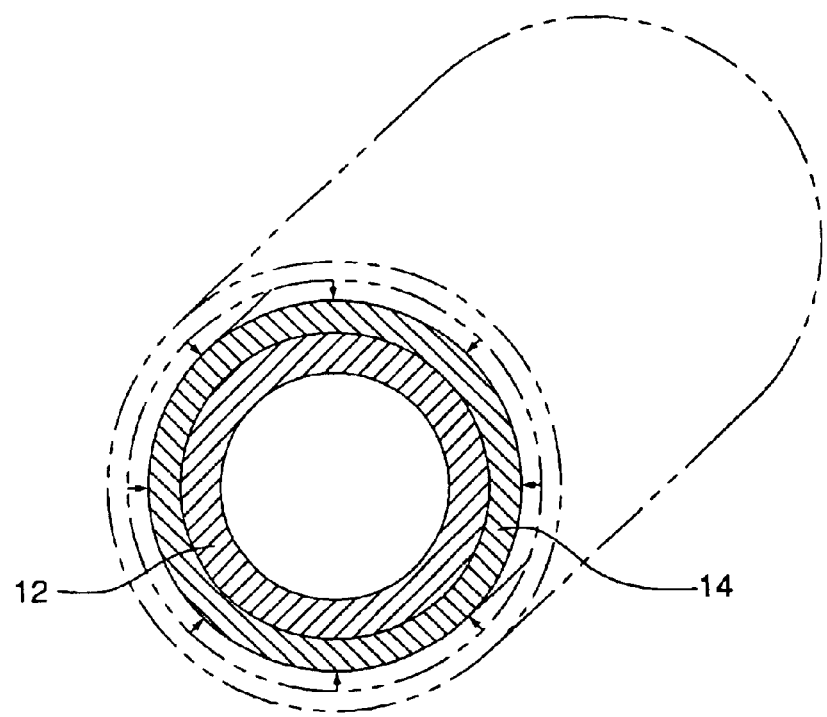
FIG. 5 illustrates, in perspective, the mating of the tube and sleeve of the invention in an interference fit manner, with the expanded sleeve diameter shown in phantom.

The properties of the polypropylene and polystyrene sleeve 14 formed by an extrusion process permit the sleeve 14 to remember its original diameter. As the sleeve 14 cools to room temperature, the inner diameter 30 of the sleeve 14 shrinks down into mating engagement with the tube 12. The resulting interference between the tube 12 and the sleeve 14 yields a very tight fit. As shown in FIG. 5, the inner surface 26 of sleeve 14 shrinks into an interference fit with the outer surface 20 of tube 12, forming the composite core.

Alternatively, the process of applying a sleeve to a paper tube may include drying the paper tube to reduce the moisture content prior to sliding the sleeve 14 thereon. If necessary, the outer diameter 24 of a tube 12 made of fiberglass may be reduced by cooling.

Figure 6:
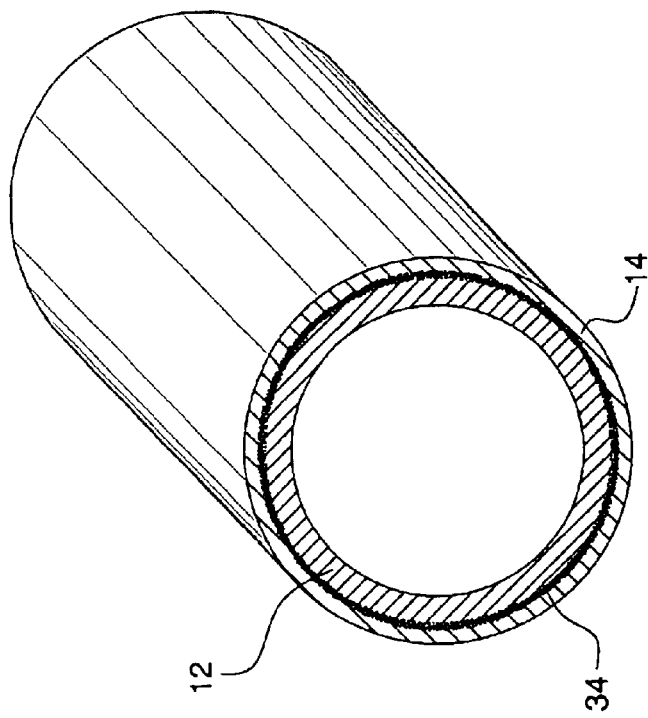
FIG. 6 illustrates an adhesive disposed between the outer surface of the tube and the inner surface of the sleeve.

The interference fit may vary for combination of different sleeve 14 materials and different tube 12 materials. As shown in FIG. 6, an adhesive 34 may be applied to the outer surface of the tube 12 before the hot sleeve 14 is slid thereon, bolstering the bond between the two members.

The outer surface 28 of the sleeve 14 has the properties required for the intended winding web material 16. The procedure of creating the properties of outer surface 28 of sleeve 14 consists of forming the sleeve 14 using the appropriate material for a customer's needs, or by finishing the outer surface 28. The selection of materials for the sleeve 14 for their properties, such as conductivity, surface hardness and the like, permit the use of standard sized tubes 12 while achieving the desired winding characteristics for the particular material.

Machine finishing the outer surface 28 of the sleeve 14 imparts a variety of performance characteristics to the core, such as start-up characteristics, static free properties, image free surfaces, a variety of shapes, non-photosensitive surfaces, and the like. Finishing of the outer surface 28 may be accomplished through the manual use of tools to provide the desired outer surface properties. Finishing of the outer surface may be done after sliding the sleeve 14 over the tube 12.

The resulting composite core is water-resistant, permitting washing of the core for reuse. The present invention improves the product cleanliness of paper tubes 12 by using the sleeve 14 to seal the outer surface 20 of the tube 12. The present invention does not require end caps or other means to provide stability.

Modification, change and substitution are intended in the foregoing disclosure. In some instances, some features of the invention will be employed without a corresponding use of other features. Accordingly, it is appropriate that the claims be construed broadly and in a manner consistent with the spirit and scope of the invention herein.

We claim:

1. A method of forming a composite core comprising the steps of:
   providing a standard sized hollow cylindrically shaped tube made of a fiberglass resin composite, the tube having an inner surface and an outer surface, the inner surface defining an inner diameter, the outer surface defining an outer diameter, and the tube having a thickness between the inner surface and outer surface;
   providing a washable rigid sleeve that resists discoloration upon washing made of extruded polypropylene or other polymer comprising a polished outer surface having a sufficient hardness that it can be machined by a lathe, and an inner surface, the inner surface defining an inner diameter, the outer surface defining an outer diameter, and the tube having a thickness between the inner surface and outer surface, wherein, at room temperature, the inner diameter of the rigid sleeve is smaller than the outer diameter of the tube;
   heating the rigid sleeve, wherein the inner diameter of the sleeve is increased to a dimension greater than the outer diameter of the tube;
   sliding the rigid sleeve over the cylindrical tube;
   cooling the rigid sleeve so that the inner diameter of the sleeve shrinks toward its original diameter and contacts the outer surface of the tube in an interference fit; and
   wherein the rigid sleeve protects the outer surface of the tube from becoming discolored.

2. The method of claim 1, further including the step of controlling the winding characteristics of the core.

3. The method of claim 2, wherein the step of controlling further includes the step of fixing the rigid sleeve made of a different material to the standard sized cylindrical tube.

4. The method of claim 3, wherein the step of controlling further includes the step of grinding the outer surface of the sleeve and polishing the outer surface of the sleeve.

5. The method of claim 1, further including the step of applying adhesive to the outer surface of the tube prior to fixing the sleeve to the tube.

6. A method of forming a composite core comprising the steps of:
   providing a hollow, rigid, cylindrically shaped tube made of a fiberglass resin composite, the tube having an inner surface and an outer surface, the inner surface defining an inner diameter of about 6.020 inches, the outer surface defining an outer diameter of about 6.475 inches, and the tube having a thickness of about 0.455 inches;
   providing a washable rigid sleeve that resists discoloration upon washing made of extruded polypropylene or other polymer comprising a polished outer surface having a sufficient hardness that it can be machined by a lathe and an inner surface, the inner surface defining an inner diameter of about 6.400 inches, the outer surface defining an outer diameter of about 6.500 inches, and the tube having a thickness of about 0.100 inches;
   heating the rigid sleeve to a temperature between 275 and 300 degrees Fahrenheit, wherein the inner diameter of the sleeve is increased to about 6.500 inches;
   sliding the rigid sleeve over the cylindrical tube;
   cooling the rigid sleeve, wherein the inner diameter of the sleeve shrinks toward its original diameter and contacts the outer surface of the tube in an interference fit; and
   wherein the rigid sleeve protects the outer surface of the tube from becoming discolored.

7. A method of forming a composite core comprising the steps of:
   providing a hollow cylindrically shaped tube made of a fiberglass resin composite, the tube having an inner surface and an outer surface, the inner surface defining an inner diameter of about 10.040 inches, the outer surface defining an outer diameter of about 10.510 inches, and the tube having a thickness of about 0.470 inches;
   providing a washable rigid sleeve that resists discoloration upon washing made of extruded polypropylene or other polymer comprising a polished outer surface having a sufficient hardness that it can be machined by a lathe and an inner surface, the inner surface defining an inner diameter of about 10.460 inches, the outer surface defining an outer diameter of about 10.585 inches, and the tube having a thickness of about 0.125 inches;
   heating the rigid sleeve to a temperature between 275 and 300 degrees Fahrenheit, wherein the inner diameter of the sleeve is increased to a dimension greater than about 10.510 inches;
   sliding the rigid sleeve over the cylindrical tube;
   cooling the rigid sleeve, wherein the inner diameter of the sleeve shrinks toward its original diameter and contacts the outer surface of the tube in an interference fit; and
   wherein the rigid sleeve protects the outer surface of the tube from becoming discolored.

8. A composite winding core comprising:
   a rigid hollow cylindrical tube made of a fiberglass resin composite, the tube having an inner surface and an outer surface, the inner surface defining an inner diameter, the outer surface defining an outer diameter, and the tube having a thickness between the inner surface and outer surface;
   an expandable, washable, rigid sleeve that does not become discolored upon washing made of extruded polypropylene or other polymer that is expandable upon application of heat comprising a polished outer surface having a sufficient hardness that it can be machined by a lathe and an inner surface, the inner surface defining an inner diameter, the outer surface defining an outer diameter, and the tube having a thickness between the inner surface and outer surface;
   the inner surface of the rigid sleeve in contact with the outer surface of the tube in an interference fit; and
   wherein the rigid sleeve protects the outer surface of the tube from becoming discolored.

9. A composite winding core comprising:
   a rigid hollow cylindrical tube made of a resin composite, the tube having an inner surface and an outer surface, the inner surface defining an inner diameter, the outer surface defining an outer diameter, and the tube having a thickness between the inner surface and outer surface;
   a washable rigid sleeve that resists discoloration upon washing made of extruded plastic material that is expandable upon application of heat comprising a polished outer surface having a sufficient hardness that it can be machined by a lathe and an inner surface, the inner surface defining an inner diameter, the outer surface defining an outer diameter, and the tube having a thickness between the inner surface and outer surface;
   the inner surface of the rigid sleeve in contact with the outer surface of the tube in an interference fit; and wherein the rigid sleeve protects the outer surface of the tube from becoming discolored.

10. A composite winding core according to claim 9, wherein an adhesive is disposed between the tube and rigid sleeve.

11. A method of forming a composite core comprising the steps of:
providing rigid hollow cylindrically shaped tube made of a polyester and paper composite, the tube having an inner surface and an outer surface, the inner surface defining an inner diameter, the outer surface defining an outer diameter, and the tube having a thickness between the inner surface and outer surface;
providing a washable rigid sleeve that resists discoloration upon washing made of extruded polypropylene or other polymer comprising a polished outer surface having a sufficient hardness that it can be machined by a lathe, and an inner surface, the inner surface defining an inner diameter, the outer surface defining an outer diameter, and the tube having a thickness between the inner surface and outer surface, wherein, at room temperature, the inner diameter of the rigid sleeve is smaller than the outer diameter of the tube;
heating the rigid sleeve, wherein the inner diameter of the sleeve is increased to a dimension greater than the outer diameter of the tube;
sliding the rigid sleeve over the cylindrical tube;
cooling the rigid sleeve so that the inner diameter of the sleeve shrinks toward its original diameter and contacts the outer surface of the tube in an interference fit; and
wherein the rigid sleeve protects the outer surface of the tube from becoming discolored.

12. The method of claim 11, further including the step of controlling the winding characteristics of the core.

13. The method of claim 12, wherein the step of controlling further includes the step of fixing the rigid sleeve made of a different material to the standard sized cylindrical tube.

14. The method of claim 13, wherein the step of controlling further includes the step of grinding the outer surface of the sleeve and polishing the outer surface of the sleeve.

15. The method of claim 11, further including the step of applying adhesive to the outer surface of the tube prior to fixing the sleeve to the tube.

16. A composite winding core comprising:
a rigid hollow cylindrical tube made of a polyester and paper composite, the tube having an inner surface and an outer surface, the inner surface defining an inner diameter, the outer surface defining an outer diameter, and the tube having a thickness between the inner surface and outer surface;
an expandable, washable, rigid sleeve that does not become discolored upon washing made of extruded polypropylene or other polymer that is expandable upon application of heat comprising a polished outer surface having a sufficient hardness that it can be machined by a lathe and an inner surface, the inner surface defining an inner diameter, the outer surface defining an outer diameter, and the tube having a thickness between the inner surface and outer surface;
the inner surface of the rigid sleeve in contact with the outer surface of the tube in an interference fit; and
wherein the rigid sleeve protects the outer surface of the tube from becoming discolored.

17. The composite winding core according to claim 16, wherein an adhesive is disposed between the tube and rigid sleeve.

* * * * *